Feb. 28, 1950 D. D. GRIEG 2,498,675

RADIO RECEIVER

Filed May 24, 1943 2 Sheets-Sheet 1

A.M. TRANSLATION

F.M. TRANSLATION

INVENTOR.
DONALD D. GRIEG

BY Percy P. Lantzy
ATTORNEY

INVENTOR.
DONALD D. GRIEG
BY Percy P. Lantzy
ATTORNEY

UNITED STATES PATENT OFFICE 2,498,675

RADIO RECEIVER

Donald D. Grieg, Forest Hills, N. Y., assignor to Federal Telephone and Radio Corporation, Newark, N. J., a corporation of Delaware Application May 24, 1943, Serial No. 488,179

12 Claims. (Cl. 250—20)

This invention relates to radio receivers and more particularly to a radio circuit for receiving carrier waves modulated according to different principles of modulation.

Currently there are two principles of carrier wave modulation commonly used for public broadcasting systems. One is A. M. (amplitude modulation) and the other is F. M. (frequency modulation). Besides these two principles of modulation there are others which are being used in ultra-high frequency systems of communication and in television. Of these more recent principles of modulation T. M. (time modulation), which may comprise either "single," "double pulse" or "pulse width" modulation, is rapidly becoming more and more important. "Single pulse modulation" involves the transmission of intelligence by variation in the repetition rate of the pulses. "Double pulse modulation" conveys intelligence by variation in the time interval between pairs of pulses. "Pulse width modulation" conveys intelligence by variations in width of successive pulses or alternate pulses with respect to fixed or pilot pulses.

In view of these several different principles of carrier wave modulation, that is, A. M., F. M. and T. M., it is an object of my invention to provide a radio receiver system for receiving and translating the intelligence of carrier waves modulated according to any one of a plurality of such modulating principles.

Another object of my invention is to provide a method and means for translating the modulation characteristics of a carrier wave modulated according to any one of a plurality of different modulating principles into a substantially equivalent train of time modulated impulses.

These and other objects of my invention I accomplish by providing a radio receiver having a detector for detecting carrier waves modulated according to any one of a plurality of different modulating principles such as A. M., F. M. and T. M., a translating circuit by which a characteristic of the detected wave conveying intelligence is translated into pulses having time displacement corresponding substantially to the intelligence carried by the wave, and a demodulator for demodulation of the time displaced pulses for audible reception.

By "carrier wave" I have reference to forms of carriers having corresponding frequency range, whether or not the principle of modulation is A. M., F. M. or some form of pulse modulation. These carriers may be transmitted in any desired manner.

The translator feature of the invention is so arranged that regardless of the principle of modulation of the detected carrier, a suitable translation is obtainable. In some instances, a tuning of the translator or certain stages thereof may be required to obtain the optimum quality of reception. The translator, however, is capable upon reception of a carrier or sub-carrier wave to translate the wave into a form of T. M. pulses which will produce an intelligible signal the quality of which may then be improved by proper tuning of the translator and/or the demodulator.

For a more complete understanding of the invention, reference may be had to the following detailed description to be read in connection with the accompanying drawings, in which.

Figure 1:
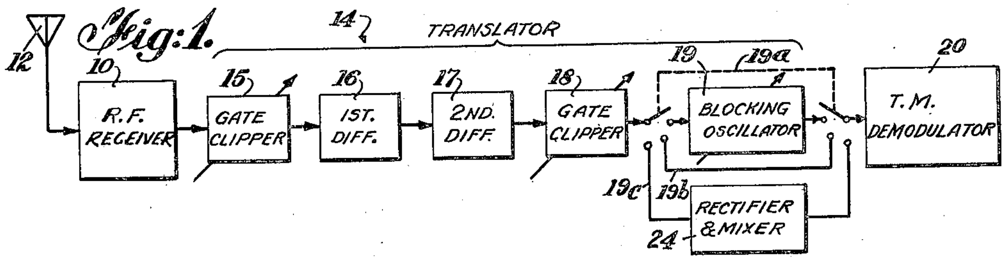
Fig. 1 is a block diagram of a radio receiver in accordance with my invention.

Referring to Fig. 1, a radio receiver is shown according to my invention comprising the usual R. F. detector stage 10 coupled to an antenna 12 for reception of carrier waves. The output of the detector 10 is applied to a translator 14 which comprises a gate clipper 15, first and second differentiating circuits 16 and 17 (preferably resistance-capacitance circuits), a second gate clipper 18, a blocking oscillator 19 and a rectifier and mixer device 24 which is interchangeable by a switching arrangement 19a with the oscillator 19. The gate clippers 15 and 18 may be of any known form whereby the waves are clipped between two predetermined limits. This is commonly accomplished by means of two limiters connected in series. The clipping levels, of course, are preferably adjustable for obtaining that portion of the input wave having a characteristic conveying in substantially linear proportion the intelligence with which the wave is modulated. This double limiting operation produces a trapezoidal wave form when an amplitude modulated or frequency modulated carrier wave is applied to the gate clipper.

The blocking or trigger oscillator 19 may be of various known forms, for example, it may be a blocking tube oscillator normally biased so that it will respond to a pulse of predetermined amplitude for initiation of an oscillation whereupon a pulse is produced thereby corresponding to the initiating impulse and which thereafter provides a period non-susceptive to input pulses of said predetermined and smaller amplitudes. This period of non-susceptibility may be adjusted so as to block, if desired, the next succeeding input pulse or pulses occurring during such period. An improved oscillator having this character of operation is disclosed in a copending application of E. Labin and myself Serial No. 488,183, filed May 24, 1943, now Patent No. 2,419,570, issued April 29, 1947. It will be understood, of course, that many forms of pulse dividers or pulse blocking systems may be used for this purpose.

If desired, as hereinafter described in more detail, the oscillator may be cut out of the circuit by manipulation of the switch 19*a*. When switched to connection 19*b*, the oscillator 19 is by-passed and when switched to connection 19*c*, the pulse energy is rectified and mixed at 24 thereby making the negative and positive input pulses unidirectional. Device 24, for example, is a well-known rectifier and amplifier arrangement whereby the input pulses are first rectified and then mixed in an amplifier with unrectified input pulses, the amplifier having cut off characteristics such as to limit the output thereof to pulses of a given polarity as illustrated, for example, in U. S. Patent No. 2,061,734, granted November 24, 1936.

The output pulses of the translator 14 are applied to the T. M. demodulator 20 for demodulation of the intelligence conveyed by the displacement of the pulses. While the demodulator 20 may be of various constructions such for example as disclosed in U. S. Patent No. 2,266,401 it preferably is of the character disclosed in my copending application Serial No. 459,959, filed September 28, 1942, now Patent No. 2,416,306 granted February 25, 1947. This demodulation, for example, preferably is of the character involving the generating or synchronizing of an energy wave having recurring inclined portions, the period of which is comparable to the unmodulated time spacing of the pulses. The wave and the pulses are combined, the pulses being superimposed on the wave at points along the inclined portions thereof according to the time displacement of the pulses. This produces by threshold clipping output pulse energy which varies in amplitude according to the time modulation of the input pulses.

Figure 2:
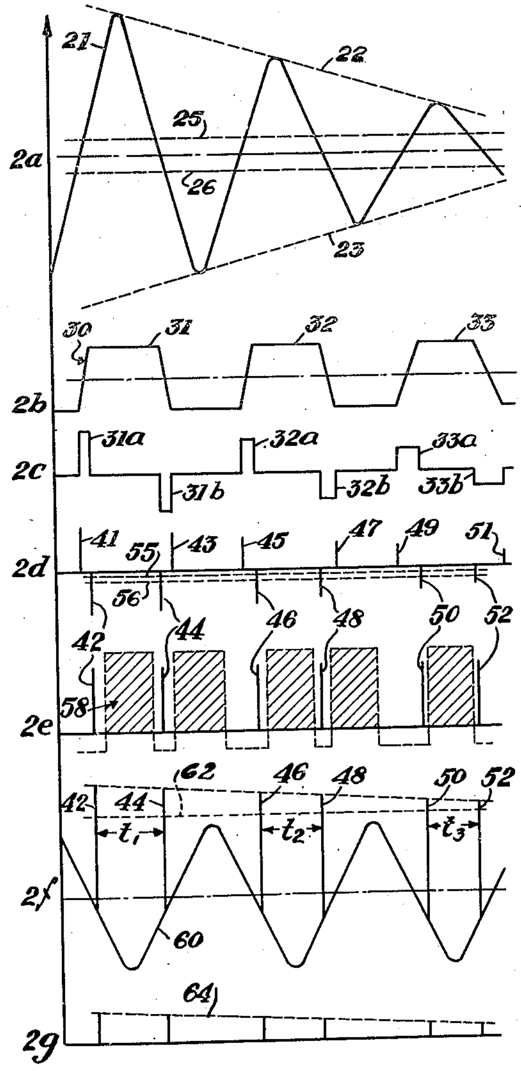
Figs. 2 and 3 are graphical illustrations showing the steps of translation for carrier waves modulated according to the principles of amplitude modulation and frequency modulation, respectively.

In Fig. 2, a plurality of curves having the same time base illustrates the operating steps of the translator 14 and demodulator 20 when an amplitude modulated wave is received. Curve 2*a* shows an enlarged view of a portion 21 of the carrier wave which outlines an envelope 22, 23. Energy of this wave when passed through the gate clipper 15 is clipped between the limits 25 and 26. While I have shown these limiting levels to be equally spaced on opposite sides of the axis of the carrier wave, it will be understood that they may be selected to one side or the other of the axis if desired. The importance of this selection is that the sides of the undulations between the limiting levels should be such that the slopes thereof vary in substantially linear proportion to the amplitude variation of the corresponding undulations. It is preferable, therefore, that the limit clipping operation be made near the axis of the carrier.

It will be noted that by limit clipping the carrier wave near the axis thereof that a large portion of the undulations of the wave forming the envelopes is eliminated. This clipping of an amplitude modulated wave for translation into time modulated pulses eliminates a large percentage of the undulations of the wave and therefore, also, to a very large extent, noise and other interfering voltage fluctuations occurring on the wave. The limit clipping of gate clipper 15 results in a trapezoidal wave 30, curve 2*b*, this portion segregated from the wave 21 being amplified as indicated by comparison of curve 2*b* with the portion between levels 25 and 26 of curve 2*a*. It will be clear that a very small portion of modulation characteristic of the wave 21 is retained in the trapezoidal wave 30, the side edges thereof being the only corresponding portions. The sides of the cycles 31, 32, 33 etc. of the trapezoidal wave 30, for example, vary in slope from cycle to cycle in proportion to the amplitude variations of the corresponding undulations of the carrier wave 21. If the gate opening of the clipper 15 is small compared to the unmodulated amplitude of the carrier, the change in slope of the side edges of the cycles will be a linear function of the initial modulation of the carrier.

The first differentiator 16 translates the trapezoidal wave 30 into rectangular pulses 31*a*, 31*b*; 32*a*, 32*b*; etc. as shown by curve 2*c*. These rectangular pulses correspond in amplitude and width to the slope of the corresponding side edges of the cycles of the trapezoidal wave. These rectangular pulses when applied to the second differentiator 17 are further translated by producing for each such pulse two narrow positive and negative pulses such as represented by the pulse pairs 41, 42; 43, 44; 45, 46; 47, 48; 49, 50; 51, 52; etc. of curve 2*d*. It will be noted that the rectangular pulses of curve 2*c* vary in amplitude and the subsequent differentiation carries over this variation so that the pulses at curve 2*d* likewise vary in amplitude and each pair of pulses such as pulses 41 and 42 correspond in position to the leading and trailing edges of the corresponding input pulse of curve 2*c*.

The pulses of curve 2*d* are limited by a second gate clipping by the clipper 18 between levels which may be selected on either side of the axis of the curve and which removes the amplitude variation of the pulses. For purposes of illustration the clipping operation is shown on the negative side of the curve between levels 55 and 56. The clipped portions of the negative pulses are amplified by the clipper as desired giving the corresponding pulses shown in curve 2*e*.

The next operation of the translator is that of blocking. For amplitude modulated waves the blocking oscillator may be adjusted so as not to have a blocking function if the carrier frequency is not too high for proper operation of the demodulator. If the carrier frequency is too high, alternate pulses or groups of pulses may be eliminated whichever may be desired. For purposes of illustration, the blocking oscillator is indicated for wave 21 to be adjusted to provide a blocking period 58 which is of a duration such as not to interfere with the pulse output of the clipper 18. As shown in curve 2*f*, the pulse output of the blocking oscillator 19, and therefore the clipper 18 for this example, represents a displacement by pulse pairs such as 42, 44; 46, 48; 50, 52; the intervals $t_1$, $t_2$ and $t_3$ of which vary substantially directly in proportion to the amplitude variations of the undulations of the carrier wave 21 from which the pulses are derived.

For purposes of illustrating generally one of the methods of demodulation according to my aforesaid copending application Serial No. 459,959, the pairs of pulses of curve 2*e* are shown by curve 2*f* to be applied to a sinusoidal wave 60 which by proper adjustment of the demodulator 20 may be synchronized with the unmodulated repetition frequency of the input pulses. It will be observed that when the pulses are superimposed upon the wave 60 their degree of displacement determines the amplitude thereof with respect to the threshold clipping level 62. By suitable threshold clipping, the pulses may be resolved into pulse energy as indicated by curve 2*g* which varies in amplitude according to the time modulation of the input pulses and therefore in proportion to the intelligence conveyed by the input carrier wave 21. This pulse energy of curve 2*g* provides an envelope as indicated at 64 which after passing through a suitable filter to remove the carrier pulse harmonics may be applied to an audio amplifier and/or speaker as desired.

In regard to the relative size and relationship of the several curves of Fig. 2 and of the Figs. 3–6, it will be appreciated that the proportions have been selected so as to better illustrate the invention rather than to attempt the showing of an exact reproduction of particular tests.

Figure 3:
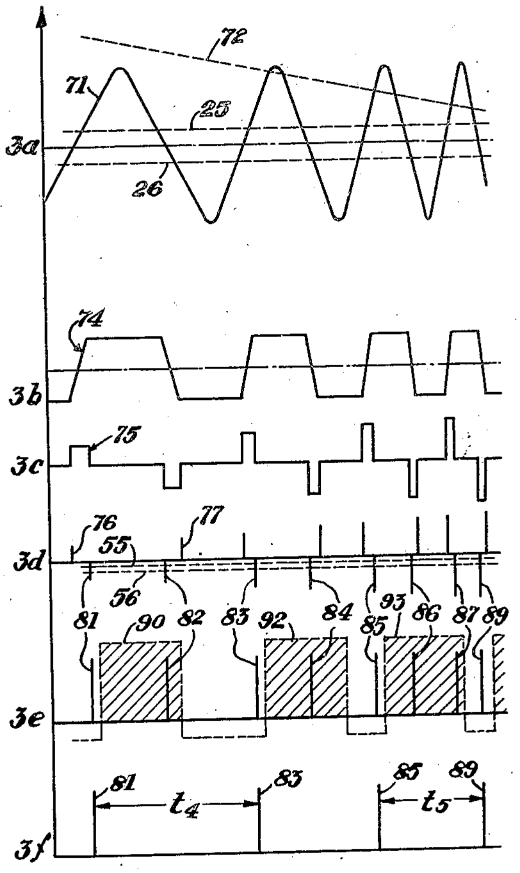

In curve 3*a* of Fig. 3, I show a portion of a frequency modulated carrier wave 71. This wave is shown to carry signal intelligence according to line 72. For translation of the frequency modulated carrier into time modulated impulses, the wave is passed through the translator 14 in a manner similar to that described in connection with the amplitude modulated wave 21 of Fig. 2. The gate clipper 15 clips the wave between levels 25 and 26 thereby producing a trapezoidal wave 74 as indicated by curve 3*b*. As in the description of wave 21, this clipping eliminates to a high percentage noise and other voltage interference. The side edges of the trapezoidal wave vary in slope in accordance with the slope of the sides of the corresponding undulations of the wave 71. The steepness of the side edges depend directly on the period of the undulations and therefore convey the modulation thereof.

The first differentiator 16 translates the wave 74 into rectangular pulse energy 75 as indicated at 3*c* which when further differentiated by the second differentiator 17 produces pulses 76, 81; 77, 82; etc. as indicated by the curve 3*d*.

The gate clipper 18 may remain at the same adjustment as for the curve 21 of Fig. 2 and thereby clip the negative pulses of curve 3*d* between levels 55 and 56. The output of the clipper 18, as indicated by curve 3*e*, comprises pulses 81, 82, 83, 84, 85, 86, 87, 89 etc.

The blocking oscillator 19 has an important function in connection with F. M. waves since the pulses thus produced vary in number in accordance with the modulation. By use of the blocking oscillator proper adjustment thereof will so eliminate pulses as to produce pulses having a constant repetition rate and in addition a displacement characteristic closely approximating the modulation characteristics of the input wave 71. This is obtained by adjustment of the oscillator so that the oscillator is adapted to be triggered by pulse 81, for example, and the period of blocking 90 initiated thereby is such as to eliminate those pulses following pulse 81 which fall within such period. As shown by curve 3*e*, the pulse 82 is eliminated by the period 90. The next succeeding pulse 83 again triggers the oscillator producing another blocking period 92 which eliminates pulse 84. The pulse 85 again triggers the oscillator producing blocking period 93 which eliminates in this instance pulses 86 and 87. This blocking of two or more consecutive pulses will not interfere appreciably with the intelligence conveyed by the train of pulses since the signal envelope may be defined by a considerably smaller number of pulses than will be derived according to my invention from the usual F. M. wave. Curve 3*f* shows the output pulses of the blocking oscillator 19 and as will be seen, the time intervals $t_4$, $t_5$ etc. of successive pairs 81, 83; 85, 89 etc. vary proportionately in accordance with the modulation of the input carrier 71. The demodulation of the pulses of curve 3*f* may be carried out similarly as illustrated by curves 2*f* and 2*g* of Fig. 2. It will be understood, however, that the T. M. demodulator 20 may operate on any of the several demodulating principles disclosed in my aforesaid copending application 459,959.

Figure 4:
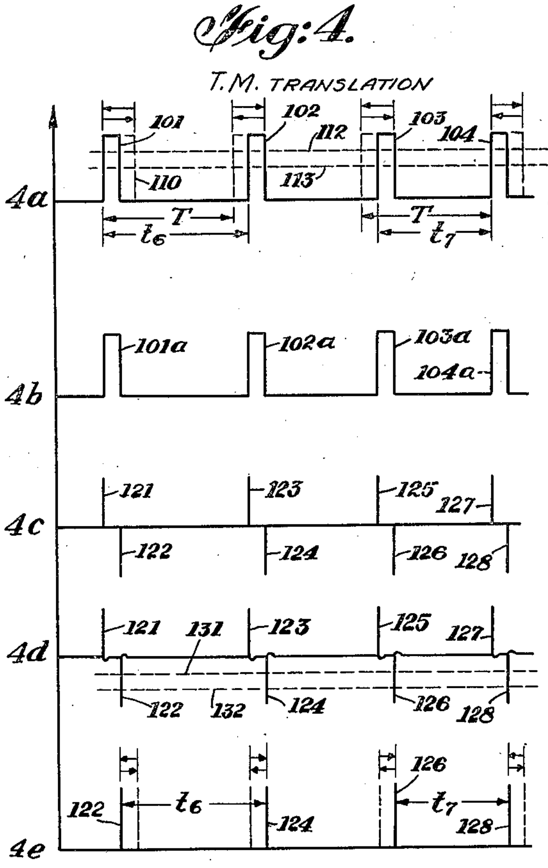
Figs. 4, 5 and 6 are graphical illustrations showing the depth of translation for carriers in the form of a series of pulses representing "double pulse" time modulation, a form of pulse width modulation with alternate fixed pulses and another form of pulse width modulation with variations occurring in successive pulses.

Curve 4*a* of Fig. 4 shows pairs of pulses 101, 102; 103, 104; etc. which convey intelligence according to the double pulse modulation principles. The maximum degree of displacement of the pulses is indicated by the relative positions of the two pairs of pulses shown, the displacement of the pulses occurring between their solid line position and their broken line position. For example, pulse 101 may be displaced anywhere desired between its present solid line position and the broken line position 110. Thus, the unmodulated interval of each pair of pulses is represented as the interval T. The one extreme displacement position shown by the pair of pulses 101, 102 is represented by the interval $t_6$ while the other extreme displacement interval $t_7$ is represented by the position of pulses 103, 104.

When the carrier wave represented by the train of pulses of curve 4*a* is applied to the gate clipper 15, the clipper is preferably adjusted to clip the pulses at elevated levels such as indicated by lines 112 and 113. This eliminates to a large extent noise voltages occurring between the pulses. The output of the clipper 15 is shown by curve 4*b* to be a series of pulses 101*a*, 102*a*, 103*a*, 104*a* etc. Differentiating these pulses by differentiator 16 produces positive and negative pulses 121, 122; 123, 124; 125, 126; 127, 128; etc. of curve 4*c*. Curve 4*d* shows these pulses as they appear after passing through the second differentiator 17, the pulses being substantially identical as in curve 4*c* since the output of the first differentiator comprises only the frequency component which may pass the second differentiator without attenuation.

The pulse energy passed by the second differentiator is limited by the gate clipper 18 between limits which may be chosen on either side of the axis of the curve 4*d*. As shown, for purposes of illustration, the limits are selected at levels 131 and 132 on the negative side of the curve. This produces a train of pulses in pairs 122, 124; 126, 128; etc. the relative displacement of which is substantially identical to the displacement between the corresponding pairs of input pulses of curve 4*a*.

The blocking oscillator in this instance may be as described previously for blocking between pulses or switched out of circuit by switch 19*a* so that it will not interfere with the pulse output of clipper 18. Thus, the pulses of curve 4*e* may be applied directly to the demodulator 20 in the manner illustrated in connection with carrier wave 21, Fig. 2.

Figure 5:
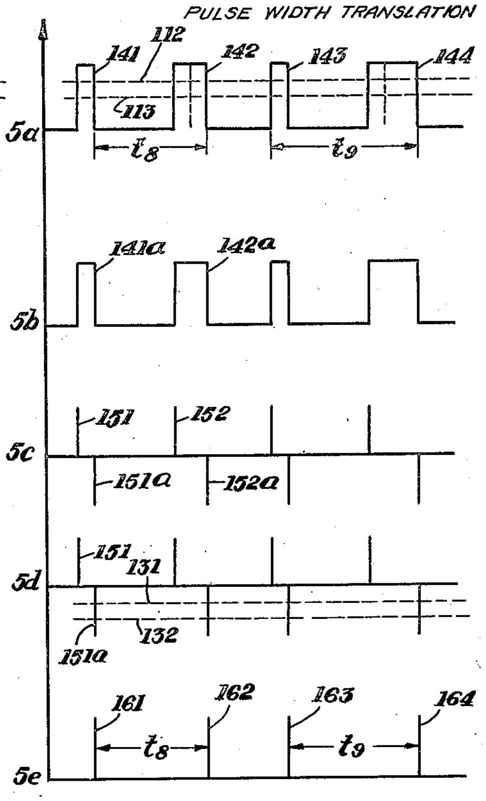

Curve 5*a* of Fig. 5 illustrates a carrier wave modulated according to one form of pulse width modulation. This form is of the character where alternate pulses 141, 143 etc. are fixed in time displacement while the alternate pulses 142, 144 etc. occurring between the fixed pulses vary in width. This pulse carrier wave may likewise be clipped between limits 112 and 113 by clipper 115 thereby producing a train of corresponding pulses 141*a*, 142*a* etc. as shown by curve 5*b*. These pulses are differentiated by the first differentiator 16 to produce alternate narrow width positive and negative pulses as shown by curve 5*c*. The second differentiating step passes the pulses of curve 5*c* as shown by curve 5*d*. The clipping operation of gate clipper 18 may be taken between the levels 131 and 132 as in the case of the time modulated carrier of Fig. 4 thereby producing a pulse energy output as shown by pulses 161, 162, 163 etc. of curve 5*e*. It will be observed that the pulse displacement interval $t_8$ of the pair of pulses 161, 162 of curve 5*e* correspond directly with the displacement between the trailing edges of the pair of pulses 141, 142 of curve 5*a*. Likewise, displacement interval $t_9$ between pulses 163, 164 corresponds to the interval between the trailing edges of pulses 143, 144. Should the clipping be selected at levels above the axis of curve 5*d*, the intervals between the output pulses of each pair would then correspond to the interval between the leading edges of the pulses of the corresponding input pair.

As in the case of the time modulated pulses of Fig. 4, the pulse output of gate clipper 18 for the pulse width modulation of Fig. 5 need not utilize the blocking function of the oscillator 19. Therefore the oscillator may be adjusted or cut out by switch 19*a* so that the pulse output of the clipper 18 is passed directly to the demodulator 20 and the intelligence conveyed thereby demodulated in the usual manner.

Figure 6:
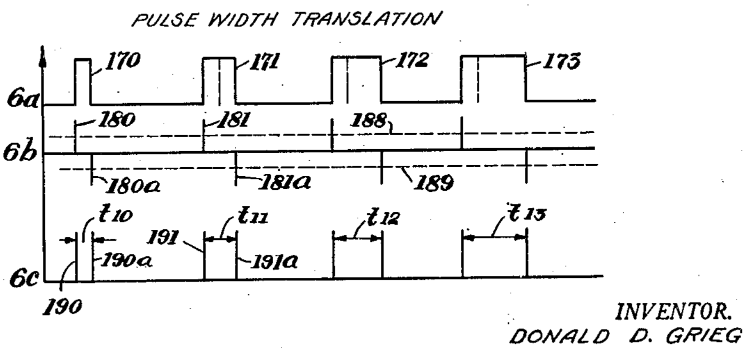

In curve 6*a* of Fig. 6 I show a train of pulses which convey signal intelligence by a different type of pulse width variation. Pulse 170 may be taken as the minimum width pulse while pulse 173 indicates the maximum width to which the pulses may be varied. Pulses 171 and 172 are of widths in between these two limits. This train of pulses will pass through the gate clipper 15 and the first and second differentiators 16 and 17 to produce alternate positive and negative pulses such as 180, 180*a* in response to each of the input pulses such as pulse 170. When this pulse energy is applied to the second gate clipper 18, the clipper may be adjusted to limit the pulses between levels 188 and 189 and the output of the clipper may be applied through switch 19*a* to connection 19*c* whereby the positive or the negative pulses, as the case may be, are rectified and then mixed with the unrectified pulses thereby producing an output of pulses 190, 190*a*; 191, 191*a* etc. as shown by curve 6*c*.

It will be observed that the intervals between the pulses of each pair 190, 190*a*; 191, 191*a* etc. are directly proportional to the widths of the corresponding input pulses 170, 171, etc. Thus, the signal intelligence represented by the width variation of the input pulses is translated into double pulse modulated energy which may be applied to the demodulator 20 and thereby demodulated in the usual manner.

From the foregoing description, it is clear that I have shown several forms of carrier waves which may be received and translated for demodulation by using common portions of the same radio receiver. While the several parts of the translator may require adjustment in order to obtain optimum quality of the intelligence conveyed by carrier waves modulated according to different principles, detection of intelligible reception of carrier waves regardless of the principles of modulation and many variations in the transmission characteristics thereof, is possible by means of my receiver system without requiring fine adjustment or tuning. The quality of the reception, however, may be improved by proper tuning of the different clipper stages and also the blocking oscillator and demodulator stages.

It will be readily apparent to those skilled in the art that if it were possible to have the different transmitting stations controlled according to predetermined standards, that is, as to the frequency of carrier wave, repetition frequency of pulses, etc. that certain of the stages of my receiver could be adjusted permanently and require no tuning adjustment for optimum reception. I have reference here particularly to the blocking oscillator 19 and in certain instances the gate clippers 15 and 18. In view of the fact, that there are no set standards for the transmission of carrier waves according to the several different principles of modulation, it will be desirable to provide for tuning adjustment of the several stages. It will be observed, however, that the gate clippers 15 and 18 may be ganged together for simultaneous and like adjustment.

While I have shown in Fig. 3, the translation of an F. M. carrier, it will be observed that the pulses of curves 3*c* or 3*d* may be transmitted as the carrier from a transmitter in the place of the wave 71 where it is desired to transmit the modulation by pulses. Should this be the case the trains of pulses according to either curves 3*c* or 3*d* are detectable by my radio receiver and translatable into T. M. pulses such as indicated by curve 3*f* according to the operating steps of the translator feature of my invention. In my copending application Serial No. 488,178, filed May 24, 1943, now Patent No. 2,408,062, issued September 24, 1946, I show an improved radio receiver for translation of pulses varying in pulse repetition frequency into double T. M. pulses. The local pulse generator feature in such receiver may be substituted for the oscillator 19 in the present receiver.

While I have shown one embodiment of my invention together with several graphical illustrations of carrier waves that may be received, translated and demodulated according to the principles of my invention, it will be readily apparent to those skilled in the art that many modifications both in the method and the operating means for translating the carrier waves are possible without departing from the invention. It is to be understood, therefore, that the illustrations herein disclosed are given by way of example only and not as limiting the scope of the invention as set forth in the objects and the appended claims.

I claim:

1. A radio receiver system for receiving carrier waves modulated according to any one of a plurality of different modulating principles comprising means to receive a carrier wave modulated according to any one of said principles, means to limit clip the carrier wave between two limits, so that regardless of the principle of modulation, wave energy is segregated from said carrier wave having a characteristic corresponding to the modulation of the wave, means to differentiate the segregated energy to produce pulses, means to select those of the pulses which represent a train of time modulated pulses equivalent to the modulated carrier wave, and means to demodulate said time modulated pulses, the pulse selecting means including a blocking oscillator having an adjustable synchronizing range for selection of pulses within a selected range of frequencies.

2. A radio receiver system for receiving carrier waves modulated according to any one of a plurality of different modulating principles comprising means to receive a carrier wave modulated according to any one of said principles, means to limit clip the carrier wave between two limits, so that regardless of the principle of modulation, wave energy is segregated from said carrier wave having a characteristic corresponding to the modulation of the wave, means to differentiate the segregated energy to produce pulses, means to select those of the pulses which represent a train of time modulated pulses equivalent to the modulated carrier wave, and means to demodulate said time modulated pulses, the pulse selecting means including a limit clipper arranged to obtain an output of unidirectional pulses and a blocking oscillator having an adjustable synchronizing range for selection of those unidirectional pulses within a selected range of frequencies.

3. A radio receiver system for receiving carrier waves modulated according to any one of a plurality of different modulating principles comprising means to receive a carrier wave modulated according to any one of said principles, means to limit clip the carrier wave between two limits, so that regardless of the principle of modulation, wave energy is segregated from said carrier wave having a characteristic corresponding to the modulation of the wave, means to differentiate the segregated energy to produce pulses, means to select those of the pulses which represent a train of time modulated pulses equivalent to the modulated carrier wave, and means to demodulate said time modulated pulses, the pulse selecting means including a rectifier and mixer device by which pulses of opposite polarity are resolved into unidirectional pulses.

4. A radio receiver system for receiving carrier waves modulated according to any one of a plurality of different modulating principles comprising means to receive a carrier wave modulated according to any one of said principles, means to limit clip the carrier wave between two limits, so that regardless of the principle of modulation, wave energy is segregated from said carrier wave having a characteristic corresponding to the modulation of the wave, means to differentiate the segregated energy to produce pulses, means to select those of the pulses which represent a train of time modulated pulses equivalent to the modulated carrier wave, and means to demodulate said time modulated pulses, the differentiating means including first and second differentiators arranged in series relation, whereby the output of the first differentiator is subjected to a further differentiating operation by the second differentiator, and the pulse selecting means including a limit clipper arranged to obtain an output of pulses of selected amplitude and a blocking oscillator having an adjustable synchronizing range for selection of those pulses of a given polarity within a selected range of frequencies.

5. In a radio receiver system having means to receive a carrier wave modulated according to any one of a plurality of different modulating principles, means to limit clip the carrier wave between two limits, first and second differentiators arranged in series relation for resolving the clipped wave energy into pulses of opposite polarity, a two-level gate clipper adjustable for selective clipping of said pulses, a blocking oscillator, a by-pass connection, a rectifier and mixer device a time modulation demodulator, and switch means for selectively connecting said oscillator, said by-pass connection or said device, between said gate clipper and said demodulator.

6. A system for translating the modulation characteristics of a carrier wave modulated according to any one of a plurality of different modulating principles comprising means to limit said carrier wave between two limits, so that regardless of the principle of modulation, wave energy is segregated from said carrier wave having a characteristic corresponding to the modulation of the input wave, means to differentiate the segregated energy to produce pulses, and means to select those of the pulses which represent a train of time modulated pulses substantially equivalent to the modulation of the input wave, the pulse selecting means including a blocking oscillator having an adjustable synchronizing range for selection of pulses within a selected range of frequencies.

7. A system for translating the modulation characteristics of a carrier wave modulated according to any one of a plurality of different modulating principles comprising means to limit said carrier wave between two limits, so that regardless of the principle of modulation, wave energy is segregated from said carrier wave having a characteristic corresponding to the modulation of the input wave, means to differentiate the segregated energy to produce pulses, and means to select those of the pulses which represent a train of time modulated pulses substantially equivalent to the modulation of the input wave, the pulse selecting means including a limit clipper arranged to obtain an output of unidirectional pulses and a blocking oscillator having an adjustable synchronizing range for selection of those unidirectional pulses within a selected range of frequencies.

8. A system for translating the modulation characteristics of a carrier wave modulated according to any one of a plurality of different modulating principles comprising means to limit said carrier wave between two limits, so that regardless of the principle of modulation, wave energy is segregated from said carrier wave having a characteristic corresponding to the modulation of the input wave, means to differentiate the segregated energy to produce pulses, and means to select those of the pulses which represent a train of time modulated pulses substantially equivalent to the modulation of the input wave, the differentiating means including first and second differentiators whereby the output of the first differentiator is subjected to a further differentiating operation by the second differentiator, and the pulse selecting means including a limit clipper arranged to obtain an output of pulses of selected amplitude and a blocking oscillator having an adjustable synchronizing range for selection of those pulses of a given polarity within a selected range of frequencies.

9. A system for translating the modulation characteristics of a carrier wave modulated according to any one of a plurality of different modulating principles comprising means to limit said carrier wave between two limits, so that regardless of the principle of modulation, wave energy is segregated from said carrier wave having a characteristic corresponding to the modulation of the input wave, means to differentiate the segregated energy to produce pulses, and means to select those of the pulses which represent a train of time modulated pulses substantially equivalent to the modulation of the input wave, the pulse selecting means including a limit clipper adjustable to selectively clip the pulses, a pulse blocking oscillator, a rectifier-mixer device, a connection by-passing said oscillator and said device, and switch means for selectively connecting said limit clipper to said oscillator, said device and said connection.

10. A method of translating the modulation characteristics of a carrier wave modulated according to any one of a plurality of different modulating principles comprising segregating a portion of the carrier wave modulated according to any one of said principles between two limits selected so that the segregated portion retains the modulating characteristics of said carrier wave, differentiating the segregated wave portion to produce pulses, and selecting those pulses which represent a train of time modulated pulses substantially equivalent to the modulation characteristics of said carrier wave, the selection of pulses including a blocking operation adjustable for selection of pulses within a selected range of frequencies.

11. A method of translating the modulation characteristics of a carrier wave modulated according to any one of a plurality of different modulating principles comprising segregating a portion of the carrier wave modulated according to any one of said principles between two limits selected so that the segregated portion retains the modulating characteristics of said carrier wave, differentiating the segregated wave portion to produce pulses, and selecting those pulses which represent a train of time modulated pulses substantially equivalent to the modulation characteristics of said carrier wave, the selection of pulses including a limit clipping operation to obtain an output of pulses of selected amplitude and a blocking operation adjustable for selection of those pulses of a given polarity occurring within a selected range of frequencies.

12. A method of translating the modulation characteristics of a carrier wave modulated according to any one of a plurality of different modulating principles comprising segregating a portion of the carrier wave modulated according to any one of said principles between two limits selected so that the segregated portion retains the modulating characteristics of said carrier wave, differentiating the segregated wave portion to produce pulses, and selecting those pulses which represent a train of time modulated pulses substantially equivalent to the modulation characteristics of said carrier wave, the selecting operation including blocking a substantial portion of the time intervals between successive ones of the selected pulses.

DONALD D. GRIEG.

REFERENCES CITED

The following references are of record in the file of this patent:

UNITED STATES PATENTS

| Number | Name | Date |
|---|---|---|
| 2,086,918 | Luck | July 13, 1937 |
| 2,113,214 | Luck | Apr. 5, 1938 |
| 2,248,267 | Bacon | July 8, 1941 |
| 2,252,293 | Ohl | Aug. 12, 1941 |
| 2,280,707 | Kell | Apr. 21, 1942 |
| 2,284,444 | Peterson | May 26, 1942 |
| 2,323,596 | Hansell | July 6, 1943 |
| 2,324,275 | Becker | July 13, 1943 |
| 2,416,328 | Labin | Feb. 25, 1947 |
| 2,419,547 | Grieg | Apr. 29, 1947 |